(12) United States Patent
Freyer et al.

(10) Patent No.: US 7,296,597 B1
(45) Date of Patent: Nov. 20, 2007

(54) METHODS FOR SEALING AND ISOLATING PIPELINES

(75) Inventors: Rune Freyer, Stavanger (NO); Laurence Abney, Sandnes (NO); Steve Arrington, Duncan, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 0 days.

(21) Appl. No.: 11/423,097

(22) Filed: Jun. 8, 2006

(51) Int. Cl.
*F16L 55/16* (2006.01)

(52) U.S. Cl. ............................ 138/89; 138/93; 138/97; 166/285

(58) Field of Classification Search ............... 138/89, 138/97, 93; 166/285, 292, 242.1, 185
See application file for complete search history.

(56) References Cited

U.S. PATENT DOCUMENTS

| | | | | |
|---|---|---|---|---|
| 3,918,523 | A | 11/1975 | Stuber | 166/285 |
| 4,137,970 | A * | 2/1979 | Laflin et al. | 166/292 |
| 6,899,138 | B2 * | 5/2005 | Lundman | 138/93 |
| 2004/0020662 | A1 | 2/2004 | Freyer | 166/387 |
| 2004/0194971 | A1 | 10/2004 | Thomson | 166/387 |
| 2006/0115332 | A1 | 6/2006 | Abney et al. | 405/169 |
| 2006/0124304 | A1 * | 6/2006 | Bloess et al. | 166/285 |

FOREIGN PATENT DOCUMENTS

| | | |
|---|---|---|
| WO | WO 2004/057715 A2 | 7/2004 |
| WO | WO 2004/072439 A1 | 8/2004 |
| WO | WO 2005/116394 A1 | 12/2005 |

OTHER PUBLICATIONS

"SmartPlug(TM) Offshore," PSI, http://www.plugging.com/rogaland/stavanger/plugging.nsf/id/418ABEE630A5A615C1256F0A0048CEB9?OpenDocument &me..., Jun. 8, 2006, 2 pgs.

"SmartPlug(TM) Onshore," PSI, http://www.plugging.com/rogaland/stavanger/plugging.nsf/id/FCA5F5F74B15A4FDC1257053002906CE?OpenDocument &men..., Jun. 8, 2006, 2 pgs.

"Compact Plug," PSI, http://www.plugging.com/roglalnd/stavanger/plugging.nsf/id/6BAC1CCE7698E8F7C1256F0B00283992?OpenDocument &man..., Jun. 8, 2006, 2 pgs.

"Friction Plgs," PSI, http://www.plugging.com/rogaland/stavanger/plugging.nsf/id/0891643872DC2FEAC1256F0B0028903E?OpenDocument &menu..., Jun. 8, 2006, 2 pgs.

"Special Plugs," PSI, http://www.plugging.com/rogaland/stavanger/plugging.nsf/id/E2DD417A2BF6048FC1256F0B0028D70D?OpenDocument &men..., Jun. 8, 2006, 2 pgs.

(Continued)

*Primary Examiner*—Patrick F. Brinson
(74) *Attorney, Agent, or Firm*—John W. Wustenberg; Conley Rose, P.C.

(57) ABSTRACT

A method of performing a servicing operation within a pipeline comprises positioning a swellable component about at a desired location within a pipeline, exposing the swellable component to a swelling agent within the pipeline, expanding the swellable component into sealing engagement with the pipeline, thereby forming a seal across the pipeline, and opening a fluid pathway through the pipeline without removing the swellable component. Another method of performing a servicing operation within a pipeline comprises inserting into the pipeline a pipeline tool comprising an externally mounted swellable component, propelling the pipeline tool through the pipeline to about a desired location via a flow of fluid, expanding the swellable component into sealing engagement with the pipeline at about the desired location, and opening a flow path through the pipeline tool.

22 Claims, 6 Drawing Sheets

OTHER PUBLICATIONS

"PSI SmartPlug(TM) Offshore" brochure obtained from http://www.plugging.com/rogaland/stavanger/plugging.nsf/id/C743E43815481F02C1257021003E8EC2?Ope..., Jun. 8, 2006, 7 pgs.

"PSI SmartPlug(TM) Onshore" brochure obtained from http://www.plugging.com/rogaland/stavanger/plugging.nsf/id/C743E43815481F02C1257021003E8EC2?Ope..., Jun. 8, 2006, 7 pgs.

Patent application entitled "Apparatus for Sealing and Isolating Pipelines," by Rune Freyer, et al., filed Jun. 8, 2006, as U.S. Appl. No. 11/423,095.

* cited by examiner

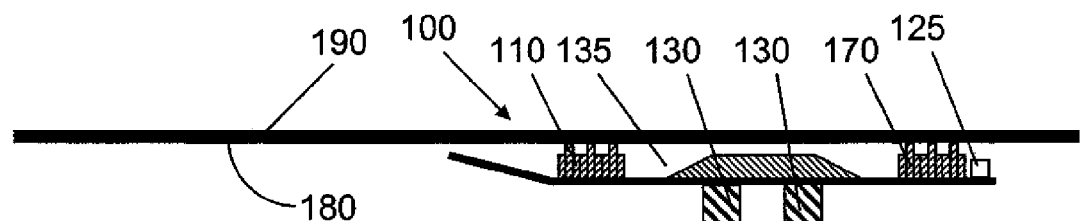
FIG. 4A
FIG. 4B
Pipeline Depressurized
FIG. 4C
Pipeline Re-pressurized
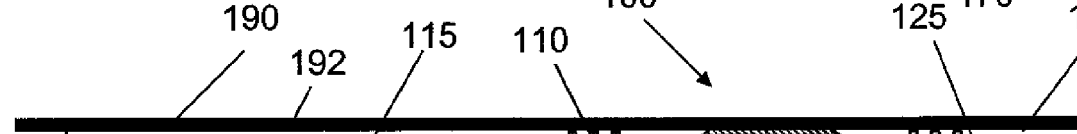
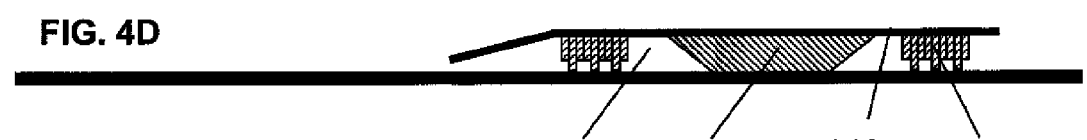
FIG. 4D

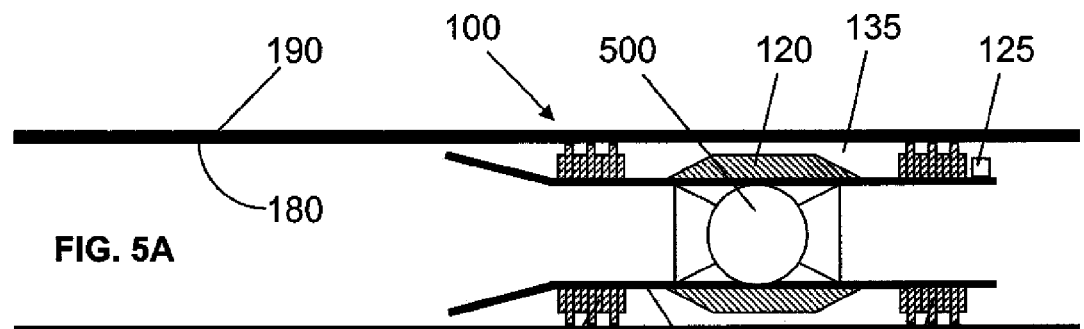
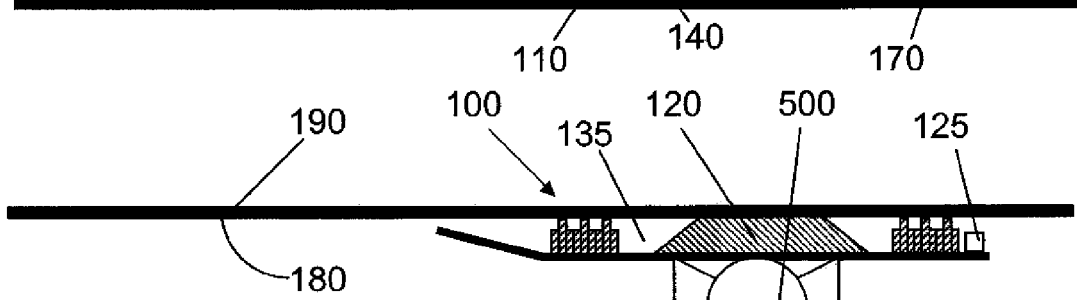
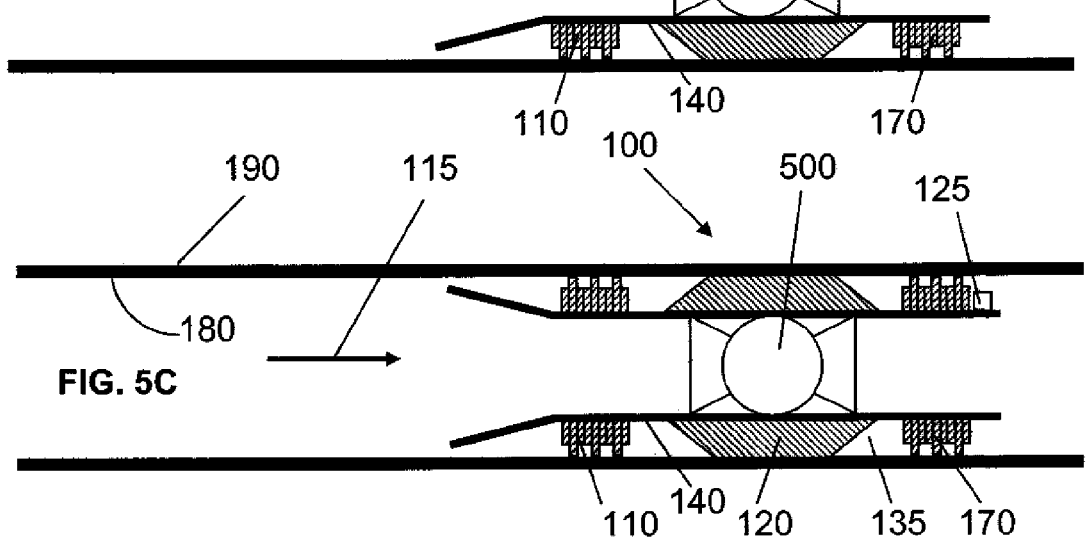

METHODS FOR SEALING AND ISOLATING PIPELINES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates generally to apparatus and methods for sealing and isolating pipelines. More particularly, the present invention relates to various embodiments of a pipeline sealing and isolation tool that permits sealing of an annular area within a pipeline using a swellable component, and temporary sealing of a flowbore through the tool using a temporary internal seal. Still more particularly, the present invention relates to methods of sealing and isolating a pipeline to perform maintenance, seal leaks, or install permanent devices within the pipeline.

BACKGROUND

Conventional pipeline maintenance and repair methods comprise first discontinuing normal pipeline operations, then isolating the section of pipeline to be repaired or maintained by closing a valve or providing some other type of seal in the pipeline, and then draining liquids or blowing down gases within the isolated section of pipeline. Once the product is removed from the isolated section of pipeline, repair and/or maintenance operations may then be performed. These operations may include cutting and replacing a leaking section of pipeline and/or installing permanent devices in the pipeline, such as a valve. When making such permanent installations in the pipeline, a structural integrity test, such as a hydrostatic test, may be performed thereafter, in which case the water used in the test must be drained, and in some cases, the pipeline is also dried depending upon the pipeline service. Finally, the pipeline can be re-commissioned with product and normal operations resumed.

These conventional methods are both time-consuming and expensive due to the discontinued pipeline operations, the loss of product that may be incurred due to draining or blowing down, and the time and expense associated with cutting into the pipeline to make the actual repair and/or perform the maintenance operation, such as replacing a leaking section of pipeline or installing a permanent device.

To address some of these inefficiencies, a pipeline isolation pig has been developed that may be used to isolate a section of pipeline so that maintenance and repair operations may then be performed. The pipeline isolation pig is a remote-controlled device that may be positioned at any desired location within the pipeline to isolate a section of pipeline so as to minimize the amount of product to drain or blow down before performing the work. It may be launched into a pipeline and pushed along by the product while being tracked to its intended destination. Then the pipeline isolation pig may be locked into position to completely seal across the pipeline. Drawbacks to the pipeline isolation pig is that it does not act as a permanent repair device, and it does not permit product flow therethrough. Instead it seals the pipeline in such a way that the seal is only removable by removing the pipeline isolation pig entirely from the pipeline. Hence, after the repair and/or maintenance operations are complete, the pipeline isolation pig must be removed from the pipeline to permit normal pipeline operations to resume.

Therefore, a need exists for a more efficient, less costly, and optionally permanent repair apparatus, and methods of performing pipeline maintenance, leak repair, and installation of permanent devices.

SUMMARY OF THE INVENTION

Disclosed herein is a method of performing a servicing operation within a pipeline comprising positioning a swellable component about at a desired location within a pipeline, exposing the swellable component to a swelling agent within the pipeline, expanding the swellable component into sealing engagement with the pipeline, thereby forming a seal across the pipeline, and opening a fluid pathway through the pipeline without removing the swellable component. In various embodiments, the servicing operation comprises repairing a leak in the pipeline wall, or positioning a permanent device within the pipeline. Opening the fluid pathway may comprise opening the permanent device and disengaging a temporary seal connected to the swellable component. The method may further comprise closing the pathway through the pipeline and performing another service operation and tracking the swellable component as it is propelled to the location. In an embodiment, the positioning comprises inserting he swellable component into the pipeline and propelling the swellable component to about the desired location via a flow of fluid. The fluid may be the swelling agent, and the swelling agent may comprise natural gas, a hydrocarbon fluid, water, brine, or another aqueous solution.

Also disclosed herein is a method of performing a servicing operation within a pipeline comprising inserting into the pipeline a pipeline tool comprising an externally mounted swellable component, propelling the pipeline tool through the pipeline to about a desired location via a flow of fluid, expanding the swellable component into sealing engagement with the pipeline at about the desired location, and opening a flow path through the pipeline tool. In various embodiments, the method further comprises tracking the pipeline tool during the propelling, or running a pipeline pig through the pipeline tool. In an embodiment, inserting the pipeline tool comprises launching the pipeline tool from a pig launcher. Expanding the swellable component may comprise absorbing the fluid, and opening a flow path through the pipeline tool may comprise disengaging a temporary seal. Expanding the swellable component may comprise sealing a leak in a wall of the pipeline. In an embodiment, the method further comprises closing the flow path through the pipeline tool, and may also comprise depressurizing a section of the pipeline upstream or downstream of the pipeline tool, and performing the servicing operation on the depressurized pipeline section. The method may further comprise re-pressurizing the depressurized pipeline section, reopening the flow path through the pipeline tool, and resuming fluid flow through the flow path. In another embodiment, the method comprises disposing a permanent device within the pipeline tool, and opening the flow path may comprise actuating the permanent device.

BRIEF DESCRIPTION OF THE DRAWINGS

For a more detailed description of the present invention, reference will now be made to the accompanying drawings, wherein:

FIGS. 4A to 4D depict one embodiment of a pipeline maintenance operation wherein the embodiment of the tool depicted in FIG. 1 may be utilized; and FIGS. 5A to 5C depict one embodiment of a pipeline operation wherein a permanent device may be installed using the embodiment of the tool depicted in FIG. 1;

NOTATION AND NOMENCLATURE

Figure 1:
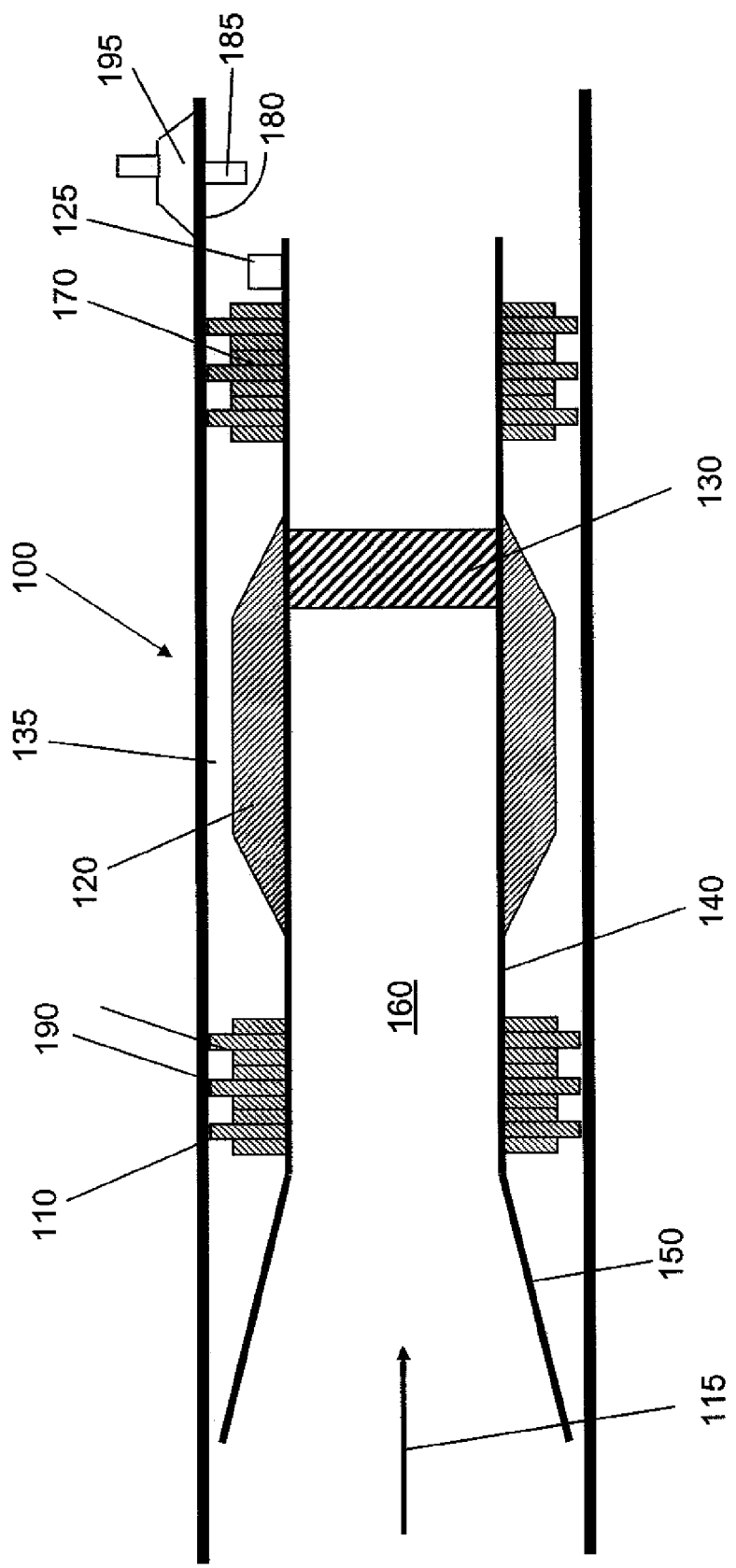
FIG. 1 is an enlarged cross-sectional side view of one representative pipeline sealing and isolation tool.

Certain terms are used throughout the following description and claims to refer to particular assembly components. This document does not intend to distinguish between components that differ in name but not function. In the following discussion and in the claims, the terms "including" and "comprising" are used in an open-ended fashion, and thus should be interpreted to mean "including, but not limited to . . . ". As used herein, the term "pipeline" includes any line or conduit in which fluid is moved, including but not limited to any onshore or offshore flow system, such as mainline systems, risers, flow lines used to transport untreated fluid between a wellhead and a processing facility, and flow lines used to transport treated fluids.

In the drawings, the cross-sectional views of the pipeline sealing and isolation tool should be viewed from left to right, with the upstream end of the pipeline at the left end of the drawing and the downstream end of the pipeline at the right end of the drawing. Stated alternatively, the pipeline sealing and isolation tool is traveling from left to right in the drawings. However, this should in no way infer that the tool is unidirectional, and proper tool design will allow for bi-directional positioning of the tool within the pipeline.

DETAILED DESCRIPTION

Various embodiments of a pipeline sealing and isolation tool operable to provide a seal within a pipeline for various purposes, including pipeline maintenance, leak repair, and installing permanent devices within the pipeline, will now be described with reference to the accompanying drawings, wherein like reference numerals are used for like features throughout the several views. There are shown in the drawings, and herein will be described in detail, specific embodiments of the pipeline tool with the understanding that this disclosure is representative only and is not intended to limit the invention to those embodiments illustrated and described herein. The embodiments of the pipeline tool and methods disclosed herein may be used in any type of application, operation, or process where it is desired to perform maintenance, repair, and/or installation of permanent devices in a pipeline. It is to be fully recognized that the different teachings of the embodiments disclosed herein may be employed separately or in any suitable combination to produce desired results.

FIG. 1 depicts one representative pipeline sealing and isolation tool 100 being propelled through a pipeline 190 by a fluid 115. The fluid 115 may be a gas or liquid, and may comprise natural gas, a hydrocarbon fluid, water, brine or other aqueous solution. As depicted, the tool 100 comprises a body 140 with an optional flared tail 150 and an internal flow cavity 160, a plurality of front guide discs 170 and a plurality of rear guide discs 110 disposed about the body 140, a temporary seal 130 positioned within the flow cavity 160, a swellable component 120 surrounding the body 140 and disposed between the sets of guide discs 110, 170, and a tracking device 125 secured to the exterior surface of the body 140.

The body 140 of the pipeline tool 100 is operable to transport the swellable component 120 and the temporary seal 130 to a desired position along the pipeline 190 to form a seal across the pipeline 190 when the swellable component 120 expands into engagement with the internal pipe wall 180. The body 140 also functions as a secondary pressure barrier against the pressure of the fluid 115, with the primary pressure barrier being the temporary seal 130. In order for the body 140 to have sufficient structural strength to perform these functions, the body 140, including the optional flared tail 150, may be constructed of a metal alloy, such as a steel or ferrous alloy, for example. Moreover, although the body 140 depicted in FIG. 1 has a solid, smooth-wall configuration, in another embodiment, the body 140 may be long, thin, flexible and/or corrugated to manipulate turns and corners along the pipeline 190. The flared tail 150 of the body 140 is an optional feature of the pipeline tool 100. When present, the flared tail 150 facilitates transit of a pipeline pig 720 through the internal flow cavity 160 after the pipeline device 100 is positioned along the pipeline 190 and the swellable component 120 is set against the internal pipe wall 180 (as illustrated in FIGS. 6A-6E). The flared tail 150 also minimizes the accumulation of debris near the pipeline tool 100 and reduces the effects of flow restrictions that may result due to the reduction in the flowpath caused by the presence of the pipeline tool 100. One of ordinary skill in the art will readily appreciate that the angle of the flared tail 150 may vary, even be optimized, to maximize its effectiveness in reducing debris accumulation and flow restrictions.

Figure 2:
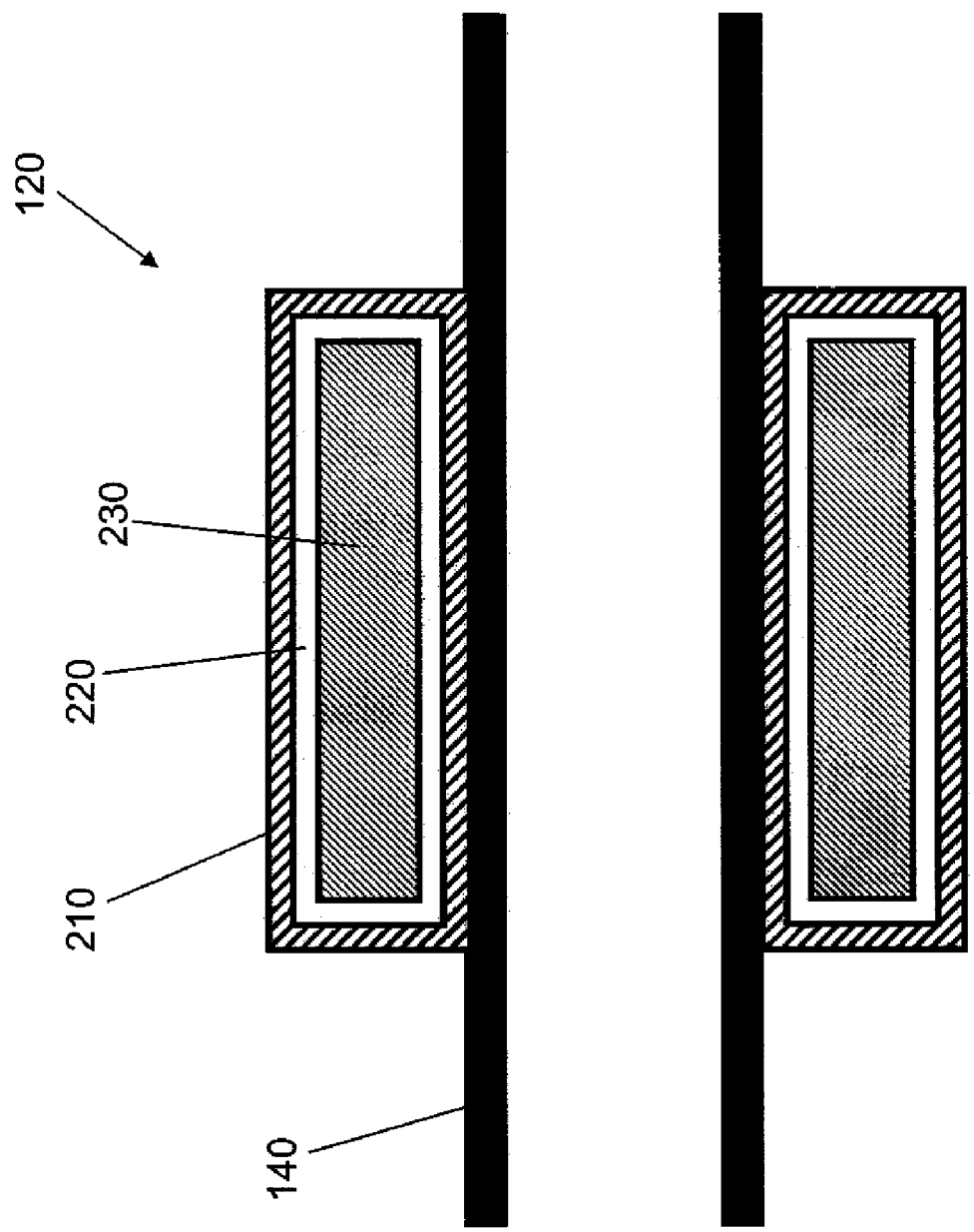
FIG. 2 is an enlarged cross-sectional side view of one representative swellable component.

The swellable component 120 may be a chemically activated material that expands over time into sealing engagement with the inner pipe wall 180 by absorbing the fluid 115 in the pipeline 190. The expanded swellable component 120 thus seals across the annulus 135 formed between the pipeline tool 100 and the inner pipe wall 180 of the pipeline 190. Referring now to FIG. 2, in one embodiment, the swellable component 120 comprises a core 230 surrounded by an external membrane 210 that is permeable to the fluid 115 and may include an inner reinforcement layer 220. In another embodiment, the swellable component 120 only comprises the core 230. The external membrane 210 shown in FIG. 2 is designed to surround and protect the core 230, but also allows migration of fluid 115 to the core 230. The membrane 210 is also permeable to the fluid 115, but the fluid 115 permeates the membrane 210 more slowly than the core 230. Thus, the membrane 210 may control the rate of swelling of the core 230 such that the tool 100 may be positioned in the pipeline 190 and engaged with the inner pipe wall 180 in a controlled manner. Upon exposure to the fluid 115, the core 230 swells at a known-rate due to absorption of the fluid 115 and the swellable component 120 expands into engagement with the inner pipe wall 180, eventually forming a seal that prevents fluid 115 flow through the annulus 135 between the pipeline tool 100 and the pipeline 190.

The choice of material for the core 230 may depend upon the type of fluid 115. The rate at which the core 230 swells upon exposure to the fluid 115 may depend primarily the material composition of the core and the viscosity of the fluid, but may also depend upon the construction of the core and/or process parameters such as fluid 115 temperature and pressure. For example, the core may have a layered construction, where different layers and/or materials are used in the core having different diffusion or swelling properties. In hydrocarbons, including natural gas and liquid hydrocarbons, the core 230 may be manufactured from an elastic polymer, such as a rubber or rubber-like material selected from the group comprising EPDM, styrene-butadiene rubber, natural rubber, ethylene-propylene monomer rubber, ethylene-vinyl acetate rubber, hydrogenated acrylonitrile-butadiene rubber, acrylonitrile-butadiene rubber, isoprene rubber, chloroprene rubber or polynorbornene. Other materials may be dissolved in mechanical mixture such as cellulose fibres. Other options for core 230 materials comprise rubber in mechanical mixture with polyvinyl chloride, methyl methacrylate, acrylonitrile, ethylacetate or other polymers. Where the fluid 115 is an aqueous fluid, such as water or brine, the core 230 may be formed using material manufactured from hydrogen dichromate dissolved in water and mixed into a compound of glycerol, diethylene glycol, and polycrylamide.

Depending upon the fluid 115, the core 230 must be chosen such that the swellable component 120 will expand sufficiently when exposed to the fluid 115 to form a seal across the annulus 135 between the pipeline tool 100 and the inner pipe wall 180 of the pipeline 190. The degree of swelling required depends upon a number of factors, including the width of the annulus 135. Material selection and thickness of the membrane 210, on the other hand, depends upon the distance the swellable component 120 must travel to its intended destination while being exposed to the fluid 115. If the pipeline tool 100 must travel a significant distance, the membrane 210 material and thickness may be chosen such that the swellable component 120 will not complete its expansion process until after the pipeline tool 100 reaches its final destination. In that scenario, the membrane 210 material selected may have a low rate of fluid 115 permeability and the membrane 210 thickness may be significant, thereby slowing exposure of the core 230 to the fluid 115 and increasing the amount of time for the core 230 to fully expand so that the pipeline tool 100 will reach its final destination before the core 230 has expanded fully. In hydrocarbons, the membrane 210 may comprise a rubber, for example acrylonitrile, hydrogenated nitrile, chloroprene, ethylene vinylacetate rubber, silicone, ethylene propylene diene monomer, butyl, chlorosulphonated polyethylene, polyurethane, ACM, BIMS or other types of rubber having less expansion or slower diffusion than the core 230. Typically, the swellable component 120 may require one to four days to fully expand. The presence of a thick membrane 210 with a low rate of permeability to the fluid 115 may, when needed, slow the core 230 expansion such that the swellable component 120 may require a longer time to fully expand. Such a slow expansion rate may be required when the pipeline tool 100 has a significant distance to travel before reaching its intended destination.

The front guide discs 170 and the rear guide discs 110 permit the pipeline tool 100 to be pushed along the pipeline 190 by the fluid 115. These discs 110, 170 form a sufficient seal with the inner pipe wall 180 of the pipeline 190 to prevent the fluid 115 from bypassing the pipeline tool 100. Instead, the fluid 115 contacts the guide discs 110, 170 and the temporary seal 130 and pushes the pipeline tool 100 along the pipeline 190.

The temporary seal 130 performs multiple functions. In its closed position, fluid 115 contacts the temporary seal 130, as well as the guide discs 110, 170, and pushes the pipeline tool 100 along the pipeline 190, as described above. Once the pipeline tool 100 is positioned at its intended location and the swellable component 120 has expanded against the inner pipe wall 180 to anchor the pipeline tool 100 in place, the temporary seal 130 permits isolation of a section of pipeline 190, upstream or downstream of the temporary seal 130 from the remainder of the pipeline 190. The isolated section of pipeline 190 may then be depressurized allowing for maintenance, leak repair, or installation of permanent devices such as a valve. Once such operations are complete, the temporary seal 130 may be selectively opened to permit the fluid 115 flow to resume through the pipeline 190.

One of ordinary skill in the art will readily appreciate that the temporary seal 130 may be any device that when closed allows the pipeline tool 100 to be pushed along the pipeline 190 by the fluid 115, and when open permits fluid 115 to flow through the internal flow cavity 160 of the pipeline tool 100. The temporary seal 130 is capable of selective actuation such that it will open when desired to permit fluid 115 flow through the internal cavity 160 of the pipeline tool 100.

In one embodiment, the temporary seal 130 is only actuatable to open once and can not be closed. In such an embodiment, the temporary seal 130 may comprise a rupture disc, which is a pressure-containing disc formed of a frangible material designed to burst open and relieve an overpressure at a predetermined differential pressure. In various embodiments, the disc may be formed of a metal or other materials, such as impervious graphite, which is a high-purity form of carbon impregnated with phenolic resin, for example. Instead of a rupture disc, various other types of removable temporary seals 130 may also be used. Removal or opening of the temporary seal 130 may be accomplished by a variety of different methods, including mechanically, hydraulically, chemically, electrically, explosively, combustively, or a combination thereof. In one embodiment, the temporary seal 130 comprises a material that degrades over time due to exposure to the fluid 115, for example. In another embodiment, one or more components of the isolation tool 100, for example body 140, is made from an acid dissolvable material such as aluminum.

In other embodiments, the temporary seal 130 is designed not only to be selectively opened, but also to be selectively closed and re-opened as desired to perform additional maintenance or repair on the pipeline 190. In such embodiments, the temporary seal 130 may comprise an electromechanical valve, for example, or another type of open/close device. Actuation of such a temporary seal 130 may be achieved by a variety of different methods, including mechanically, hydraulically, electrically, or a combination thereof. In various embodiments, the temporary seal 130 is actuated using a pressure pulse, a pressure differential, a temperature increase or decrease, a magnetic signal, an electronic signal, an electromagnetic signal, a timer, an acoustic signal, an ultrasonic signal, or other through-wall communication.

The tracking device 125 permits monitoring of the pipeline tool 100 as it traverses the pipeline 190. In an embodiment, the tracking device 125 is a mechanical fixture attached to the exterior surface of the body 140, which is operable to engage a similar mechanical stop 185 extending into the pipeline 190 at or near the final destination of the pipeline tool 100. The mechanical stop 185 may be installed using a hot tap fixture 195, for example. In this embodiment, when the tracking device 125 on the pipeline tool 100 contacts the mechanical stop 185 extending into the pipeline 190, such contact indicates that the pipeline tool 100 has reached its intended destination, and the mechanical interaction also stops the pipeline tool 100 at the location.

In another embodiment, the tracking device 125 may be connected to the exterior of the swellable component 120 such that as swelling occurs, the tracking device 125 will engage the inner pipe wall 180 first, and such engagement may stop the pipeline tool 100 at or near that location. Then the swellable component 120 continues swelling around the tracking device 125 until it forms a seal with the inner pipe wall 180 of the pipeline 190. Alternatively, in other embodiments, the tracking device 125 may comprise a device that emits a tracking signal, such as a magnet, a radioactive isotope, an electronic transmitter, an acoustic transmitter, and an ultra-sonic device, for example, thus revealing the position of the pipeline tool 100 inside the pipeline 190.

Figure 3A:
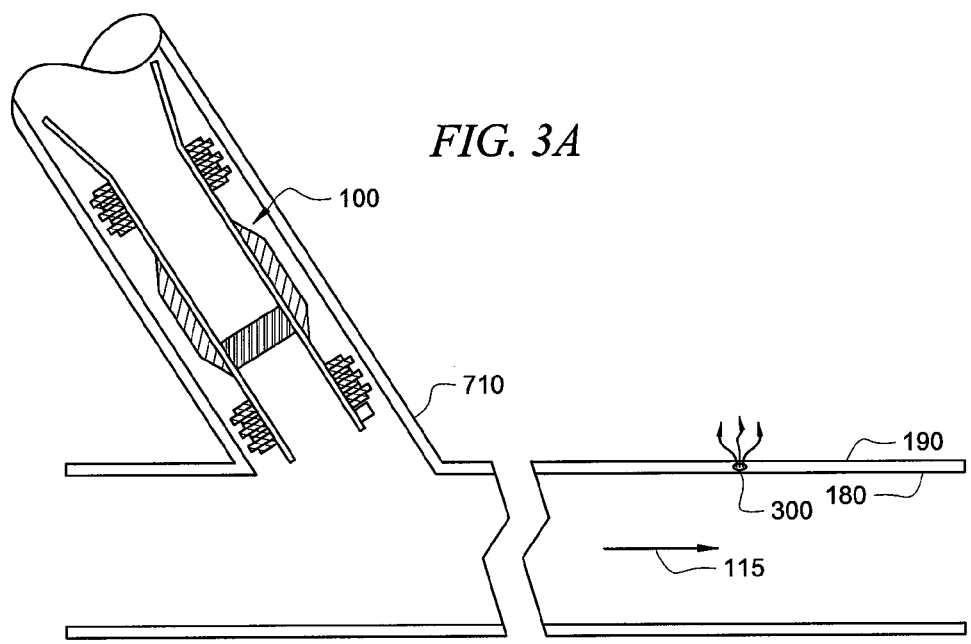
FIGS. 3A to 3D depict one embodiment of a pipeline leak repair operation wherein the embodiment of the tool depicted in FIG. 1 may be utilized.

The pipeline sealing and isolation tool 100 may be used operationally for a variety of different purposes. FIGS. 3A through 3D schematically depict one embodiment of a pipeline operation wherein the pipeline sealing and isolation tool 100 illustrated in FIG. 1 may be used to seal an external leak 300 in a pipeline 190. Referring to FIG. 3A, upon discovery and location of a pipeline leak 300, the pipeline tool 100 may be inserted into the pipeline 190 via a pipeline pig launcher 710 or another means, including placing the pipeline tool 100 into an open-ended area of the pipeline 190. The pipeline tool 100 is then propelled along the pipeline 190 by the fluid 115 towards the leak 300 location, while the position of the pipeline tool 100 is monitored using the tracking device 125.

In alternative embodiments, the pipeline tool 100 may be moved through the pipeline 190 via a force or transport means other than fluid flow. For example, the pipeline tool 100 may comprise a propulsion system and may thereby be self propelled. The propulsion system may be any suitable means for propulsion such as motorized propulsion, for example a motor coupled to a propeller, wheel, tracks, crawler/creeper arms, and the like. Alternatively, the pipeline tool 100 may be conveyed to a desired location in pipeline 190 via another tool such as a pig. For example, the pipeline tool 100 may be pushed or pulled along the pipeline via a tow unit, and the tow unit may be powered by fluid flow or other conveyance means, including self propulsion.

As the pipeline tool 100 approaches its intended destination within the pipeline 190, in this case the location of the leak 300, the flow of fluid 115 may be slowed or discontinued. Without fluid 115 to push the pipeline tool 100 via contact with the guide discs 110, 170 and the closed temporary seal 130, the pipeline tool 100 will cease to traverse the pipeline 190. Then the position of the pipeline tool 100 may be determined relative to its intended destination. If the pipeline tool 100 has stopped upstream of its intended destination, fluid 115 flow may be resumed briefly to push the pipeline tool 100 closer to that position. If, on the other hand, the pipeline tool 100 has traveled beyond its intended destination, fluid 115 flow may be injected in the opposite direction to push the pipeline tool 100 upstream to the desired position. The guide discs 110, 170 are bi-directional such that they are designed to permit the pipeline tool 100 to traverse the pipeline 190 in either direction.

Figure 3B:
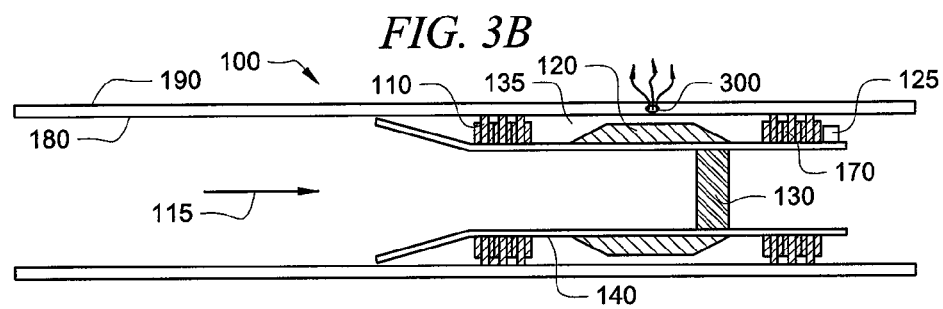
Figure 3C:
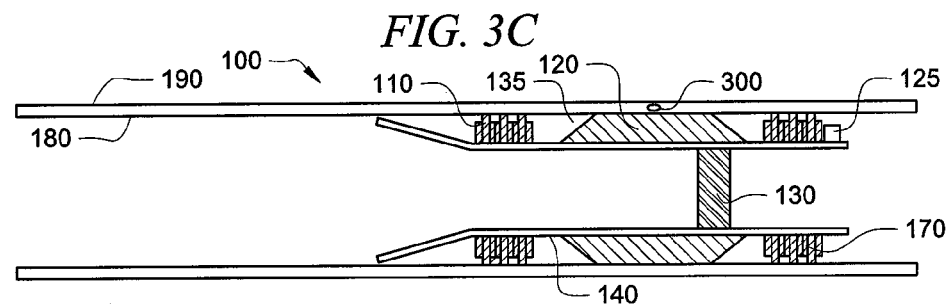

During the time that the pipeline tool 100 is traveling, and upon arrival at the leak 300 location, as shown in FIG. 3B, the swellable component 120 is absorbing the fluid 115 and expanding across the annulus 135, towards the inner pipe wall 180 of the pipeline 190 and the leak 300. As shown in FIG. 3C, once the swellable component 120 fully expands, it forms a permanent, fluid-tight seal across the annulus 135 and against the inner pipe wall 180 of the pipeline 190 such that the leak 300 is also sealed.

Figure 3D:
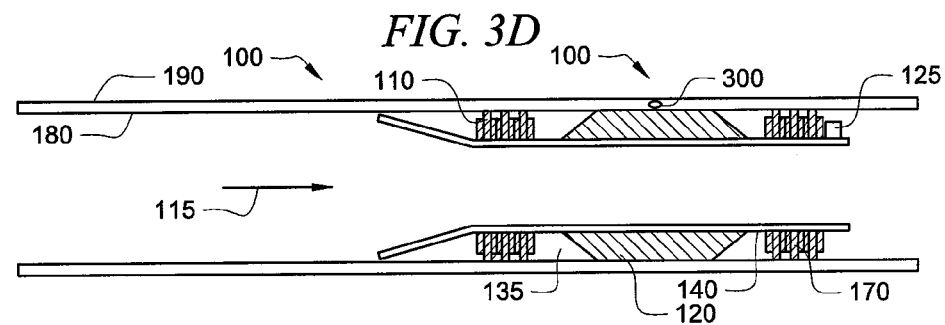
Figure 6A:
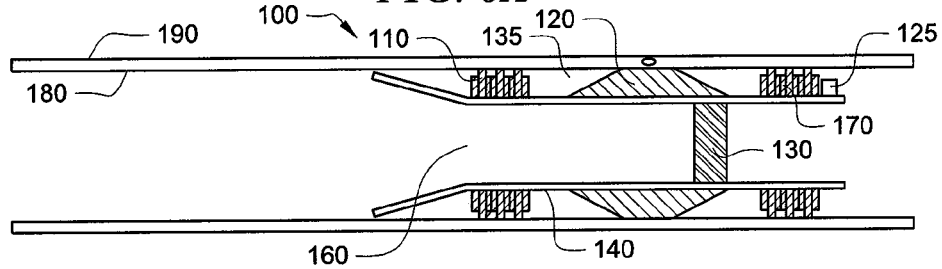
FIGS. 6A to 6D depict one embodiment of a pipeline operation wherein the embodiment of the tool depicted in FIG. 1 may be utilized in such a way as to allow for passage of a pipeline pig.
Figure 6B:
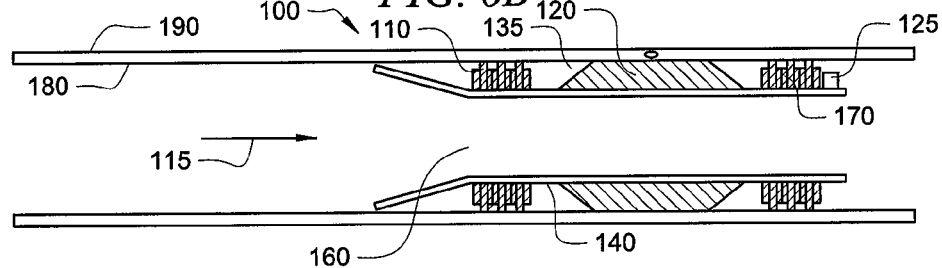
Figure 6C:
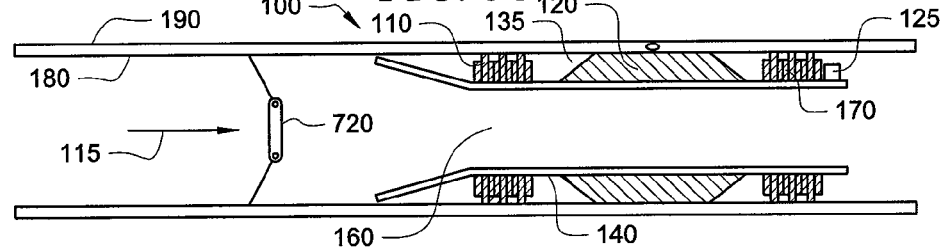
Figure 6D:
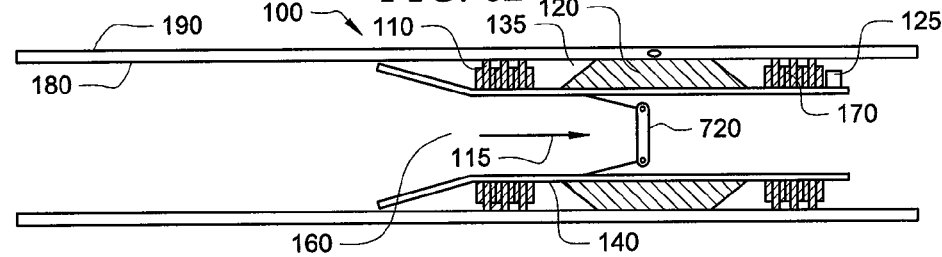
Figure 6E:
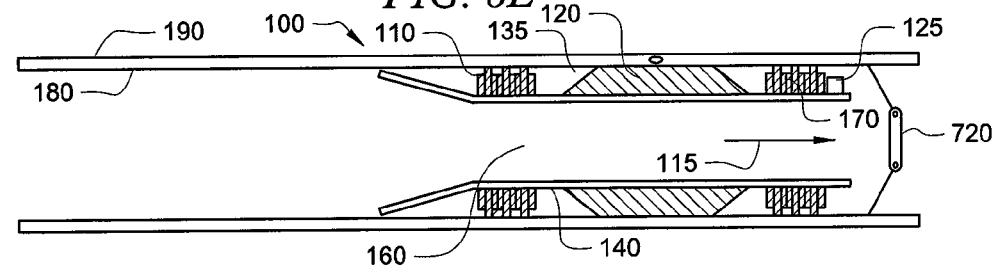

Once the swellable component 120 is set, the temporary internal seal 130 may be opened as described above using some method of actuation. In an embodiment, the temporary seal 130 is opened by pressuring up the fluid 115 within the pipeline 190. In such an embodiment, the seal formed by the swellable component 120 against the inner pipe wall 180 of the pipeline 190 is designed to withstand the higher pressure of the fluid 115 operable to open the temporary internal seal 130. When the temporary internal seal 130 is opened, fluid 115 flow can resume inside the pipeline 190, as shown in FIG. 3D. Although fluid 115 flow is reestablished, the pipeline tool 100 remains firmly in position and the leak 300 is sealed due to the expanded swellable component 120. The pipeline tool 100 may comprise a permanent leak repair, or may remain in position for an extended period of time until this section of the pipeline 190 may be cut out and replaced.

The pipeline sealing and isolation tool 100 may also be used to seat and isolate one section of pipeline 190 to perform maintenance operations on the pipeline 190. FIGS. 4A through 4D schematically depict one embodiment of a sequence for isolating an upstream section 192 of pipeline 190 from a downstream section 194 using the pipeline sealing and isolation tool 100 illustrated in FIG. 1 so that maintenance operations may be performed on the isolated section 192 of pipeline 190. In an embodiment, the pipeline tool 100 used to perform maintenance operations on the pipeline 190 comprises dual temporary internal seals 130 to ensure fluid-tight isolation between the upstream section 192 and the downstream section 194.

The pipeline tool 100 is inserted into the pipeline 190 and propelled along the pipeline 190 by the fluid 115. The position of the pipeline tool 100 inside the pipeline 190 may be monitored using the tracking device 125. As shown in FIG. 4A, when the pipeline tool 100 reaches its intended destination, it is stopped by discontinuing fluid 115 flow through the pipeline 190. During the time that the pipeline tool 100 is traveling, and upon arrival at the intended location, the swellable component 120 is absorbing the fluid 115 and expanding across the annulus 135, towards the inner pipe wall 180 of the pipeline 190. As shown in FIG. 4B, once the swellable component 120 fully expands, it forms a permanent fluid-tight seal across the annulus 135 and against the inner pipe wall 180 of the pipeline 190. Determining when the swellable component 120 has fully expanded and is set in the pipeline 190 may be accomplished in a number of ways. In one embodiment, laboratory testing of the core 230 material and the membrane 210 may be performed to estimate the rate of expansion for the given fluid 115. Then, the amount of time needed to fully expand or set the swellable component 120 may be calculated as a function of the rate of expansion of the core 230 and membrane 210 materials in the given configuration. In another embodiment, a field test may be performed. In particular, when it is estimated that enough time has elapsed for the swellable component 120 to set, the flow of fluid 115 may be resumed to pressure up the pipeline 190 upstream of the pipeline tool 100, and if the pipeline tool 100 moves in response to that pressure, the swellable component 120 is not set. In another embodiment, strain gauges may be affixed to the body 140 of the pipeline tool 100, and strain levels in the body 140 of the pipeline tool 100 may then be monitored. As the swellable component 120 sets, strain levels in the body 140 will increase, and strain measurement behavior will indicate when the swellable component 120 is set.

Once the swellable component 120 is set as shown in FIG. 4B, the upstream section 192 of the pipeline 190 is thereby isolated from the downstream section 194 of the pipeline 190 by virtue of the fully-expanded swellable component 120 sealing with the pipeline 190 and the closed dual temporary seals 130. In one embodiment, the isolated upstream section 192 of the pipeline 190 may then be depressurized to allow for maintenance operations to be performed. The downstream section 194 of the pipeline 190 may remain pressurized because the swellable component 120 and the dual temporary seals 130 ensure isolation between the depressurized and pressurized sections of the pipeline 190. As shown in FIG. 4C, upon completion of maintenance operations, the isolated section 192 of the pipeline 190 may be re-pressurized. Finally, as shown in FIG. 4D, the temporary internal seals 130 may be opened, as described above, allowing the flow of fluid 115 to resume inside the pipeline 190. Although the flow of fluid 115 is reestablished, the pipeline tool 100 remains firmly in position due to the expanded swellable component 120. The pipeline tool 100 may remain in position indefinitely to allow for similar subsequent maintenance operations wherein the dual seals 130 may be re-actuated to close, and thereby isolate the upstream section 192 of the pipeline 190 from the downstream section 194.

In an alternative embodiment, two our more pipeline tools 100 may be used to isolate a section of pipeline 190 between the tools. For example, first and second pipeline tools 100 may be positioned on either side of a leak 300 and set, thereby isolating the section of pipe between the tools 100, which thereafter may be depressurized and repaired accordingly. In alternatively embodiments, more than one pipeline tool 100 may be used one or both sides of a portion of pipeline to be isolated. For example, a first pair of pipeline tools 100 may be positioned on the downstream side of a leak and a second pair of pipeline tools 100 may be positioned on the upstream side of the leak, thereby isolating the section of pipeline containing the leak upon setting of the tools. Placement and positioning of a plurality of pipeline tools 100 can be carried out using the methods described herein. For example, a first pipeline tool 100 may be placed in the pipeline 190 followed by a sufficient flow of fluid to space the first pipeline tool 100 a desired distance in front of a second pipeline tool 100 that is subsequently placed in the pipeline. Additional fluid may be used to convey both tools to a desired location, which may be located as described herein.

The pipeline sealing and isolation tool 100 may also be used to install permanent devices, such as a valve, for example, at a particular location within the pipeline 190. FIGS. 5A through 5C schematically depict a sequence wherein the pipeline sealing and isolation tool 100 illustrated in FIG. 1 may be used to install a permanent device 500 positioned internally of the flow cavity 160 in the body 140. In an embodiment, the permanent device 500 is a ball valve that may be actuated by through-wall communication. In another embodiment, the permanent device 500 is a check valve. In another embodiment, the permanent device is a submersible pump, for example an electrical submersible pump (ESP). In an embodiment, an ESP is pumped into a production riser, for example an offshore production riser. The ESP may be placed in the production riser, for example, near the base of a deep water production riser, where the pump may be used to boost production by removing all or a portion of the hydrostatic head back pressure from the well head located on the sea floor.

As shown in FIGS. 5A through 5C, the closed permanent device 500 provides a seal to replace the temporary seal 130 in previous embodiments. The pipeline tool 100 with the permanent device 500 therein is inserted into the pipeline 190 and propelled along the pipeline 190 by the fluid 115. The position of the pipeline tool 100 inside the pipeline 190 may be monitored using the tracking device 125. As shown in FIG. 5A, when the pipeline tool 100 reaches its intended destination, it is stopped by discontinuing fluid 115 flow through the pipeline 190. During the time that the pipeline tool 100 is traveling, and upon arrival at the intended location, as shown in FIG. 5A, the swellable component 120 is absorbing the fluid 115 and expanding across the annulus 135, towards the inner pipe wall 180 of the pipeline 190. As shown in FIG. 5B, once the swellable component 120 fully expands, it forms a permanent fluid-tight seal across the annulus 135 and against the inner pipe wall 180 of the pipeline 190. Determining when the swellable component 120 is fully expanded and set may be accomplished by methods discussed above, including laboratory testing of the core 230 material and membrane 210 material, pressuring up the pipeline 190 to see if the pipeline tool 100 moves in response to the pressure, or monitoring strain levels in the body 140 of the pipeline tool 100. As shown in FIG. 5C, once the swellable component 120 is set, the permanent device 500 may be opened using an electronic signal, another type of through-wall communication, or another method, such as a pressure pulse, for example. Once the permanent device 500 is opened, the flow of fluid 115 may resume inside the pipeline 190. Although the flow of fluid 115 is reestablished, the pipeline tool 100 remains firmly in position due to the expanded swellable component 120 and may remain so for an indefinite period of time. As a result, the permanent device 500 will also remain fixed in this position and may be actuated to control fluid 115 flow through the pipeline 190 at this location.

The foregoing descriptions of specific embodiments of pipeline scaling and isolation tools and methods of utilizing such tools to perform maintenance, leak repair, and installation operations on pipelines have been presented for purposes of illustration and description and are not intended to be exhaustive or to limit the invention to the precise forms disclosed. Obviously many other modifications and variations of these embodiments are possible. In particular, maintenance, repair and installation operations may vary. For example, these methods disclose stopping the pipeline device at its intended destination by discontinuing fluid flow in the pipeline. Other methods of stopping the pipeline device may be utilized, such as opening the temporary sealing devices 130 or permanent devices 500 while maintaining the flow of fluid 115. Moreover, design of the pipeline tool body 140 may vary. Instead of the smooth-walled, solid structure disclosed, the body may comprise a corrugated, flexible housing to permit maneuvering through pipelines with numerous turns and corners. Further, the taper of the flared tail 150 may be optimized to minimize the effects of debris accumulation near the pipeline tool 100 and flow restrictions due to the presence of the pipeline tool 100 in the fluid 115 flowpath. The material comprising the swellable component 120 may vary depending on the type of fluid 115 inside the pipeline 190, whether a hydrocarbon, water, brine or other aqueous solution.

While various embodiments of pipeline sealing and isolation tools and methods of utilizing those tools to perform maintenance, leak repair and installation operations on pipelines have been shown and described herein, modifications may be made by one skilled in the art without departing from the spirit and the teachings of the invention. The embodiments described are representative only, and are not intended to be limiting. Many variations, combinations, and modifications of the applications disclosed herein are possible and are within the scope of the invention. Accordingly, the scope of protection is not limited by the description set out above, but is defined by the claims which follow, that scope including all equivalents of the subject matter of the claims.

We claim:

1. A method of performing a servicing operation within a pipeline comprising:
   positioning a swellable component about at a desired location within a pipeline;
   exposing the swellable component to a swelling agent within the pipeline;
   expanding the swellable component into sealing engagement with the pipeline, thereby forming a seal across the pipeline; and
   opening a fluid pathway through the pipeline without removing the swellable component.

2. The method of claim 1 wherein the servicing operation comprises repairing a leak in the pipeline wall.

3. The method of claim 1 wherein the servicing operation comprises positioning a permanent device within the pipeline.

4. The method of claim 3 wherein opening the fluid pathway comprises opening the permanent device.

5. The method of claim 1 wherein opening the fluid pathway comprises disengaging a temporary seal connected to the swellable component.

6. The method of claim 1 further comprising closing the pathway through the pipeline and performing another service operation.

7. The method of claim 1 wherein positioning comprises inserting the swellable component into the pipeline and propelling the swellable component to about the desired location via a flow of fluid.

8. The method of claim 6 further comprising tracking the swellable component as it is propelled to the location.

9. The method of claim 7 wherein the fluid is the swelling agent.

10. The method of claim 1 wherein the swelling agent comprises natural gas, a hydrocarbon fluid, water, brine, or another aqueous solution.

11. A method of performing a servicing operation within a pipeline comprising:
    inserting into the pipeline a pipeline tool comprising an externally mounted swellable component;
    propelling the pipeline tool through the pipeline to about a desired location via a flow of fluid;
    expanding the swellable component into sealing engagement with the pipeline, thereby forming a seal across the pipeline, at about the desired location; and
    opening a flow path through the pipeline tool.

12. The method of claim 11 further comprising tracking the pipeline tool during the propelling.

13. A method of performing a servicing operation within a pipeline comprising:
    inserting into the pipeline a pipeline tool comprising an externally mounted swellable component;
    propelling the pipeline tool through the pipeline to about a desired location via a flow of fluid;
    expanding the swellable component into sealing engagement with the pipeline at about the desired location;
    opening a flow path through the pipeline tool; and
    running a pipeline pig through the pipeline tool.

14. A method of performing a servicing operation within a pipeline comprising:
    inserting into the pipeline a pipeline tool comprising an externally mounted swellable component;
    propelling the pipeline tool through the pipeline to about a desired location via a flow of fluid;
    expanding the swellable component into sealing engagement with the pipeline at about the desired location; and
    opening a flow path through the pipeline tool;
    wherein inserting the pipeline tool comprises launching the pipeline tool from a pig launcher.

15. The method of claim 11 wherein expanding the swellable component comprises absorbing the fluid.

16. A method of performing a servicing operation within a pipeline comprising:
    inserting into the pipeline a pipeline tool comprising an externally mounted swellable component;
    propelling the pipeline tool through the pipeline to about a desired location via a flow of expanding the swellable component into sealing engagement with the pipeline at about the desired location; and
    opening a flow path through the pipeline tool;
    wherein opening a flow path through the pipeline tool comprises disengaging a temporary seal.

17. A method of performing a servicing operation within a pipeline comprising:
    inserting into the pipeline a pipeline tool comprising an externally mounted swellable component;
    propelling the pipeline tool through the pipeline to about a desired location via a flow of fluid;
    expanding the swellable component into sealing engagement with the pipeline at about the desired location; and
    opening a flow path through the pipeline tool;
    wherein expanding comprises sealing a leak in a wall of the pipeline.

18. A method of performing a servicing operation within a pipeline comprising:
    inserting into the pipeline a pipeline tool comprising an externally mounted swellable component;
    propelling the pipeline tool through the pipeline to about a desired location via a flow of fluid;
    expanding the swellable component into sealing engagement with the pipeline at about the desired location;
    opening a flow path through the pipeline tool; and
    closing the flow path through the pipeline tool.

19. The method of claim 18 further comprising depressurizing a section of the pipeline upstream or downstream of the pipeline tool; and performing the servicing operation on the depressurized pipeline section.

20. The method of claim 19 further comprising:
    re-pressurizing the depressurized pipeline section;
    reopening the flow path through the pipeline tool; and
    resuming fluid flow through the flow path.

21. A method of performing a servicing operation within a pipeline comprising:
    inserting into the pipeline a pipeline tool comprising an externally mounted swellable component;
    propelling the pipeline tool through the pipeline to about a desired location via a flow of fluid;

expanding the swellable component into sealing engagement with the pipeline at about the desired location;
opening a flow path through the pipeline tool; and
disposing a permanent device within the pipeline tool.

22. The method of claim 21 wherein opening the flow path comprises actuating the permanent device.

* * * * *